(12) United States Patent
Manderscheid et al.

(10) Patent No.: US 12,594,734 B2
(45) Date of Patent: Apr. 7, 2026

(54) METHOD FOR PRODUCING A LIGHT PANE FOR AN ILLUMINANT, LIGHT PANE, ILLUMINANT, AND MOTOR VEHICLE

(71) Applicant: AUDI AG, Ingolstadt (DE)

(72) Inventors: Maximilian Manderscheid, Rohrbach (DE); Daniel Kugele, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 136 days.

(21) Appl. No.: 18/429,154

(22) Filed: Jan. 31, 2024

(65) Prior Publication Data

US 2024/0262060 A1 Aug. 8, 2024

(30) Foreign Application Priority Data

Feb. 7, 2023 (DE) ..................... 10 2023 102 892.8

(51) Int. Cl.
*F21S 41/43* (2018.01)
*B29D 11/00* (2006.01)
(52) U.S. Cl.
CPC .... *B29D 11/00903* (2013.01); *B29D 11/0074* (2013.01); *B29D 11/00951* (2013.01); *F21S 41/435* (2018.01)

(58) Field of Classification Search
None
See application file for complete search history.

(56) References Cited

U.S. PATENT DOCUMENTS

| | | | | |
|---|---|---|---|---|
| 4,745,857 | A * | 5/1988 | Putnam | B25J 9/0093 |
| | | | | 101/151 |
| 2017/0122522 | A1* | 5/2017 | Claire | F21V 1/17 |
| 2020/0164557 | A1 | 5/2020 | Buisson et al. | |
| 2020/0319391 | A1* | 10/2020 | Vasylyev | G02B 6/001 |

FOREIGN PATENT DOCUMENTS

| | | | | |
|---|---|---|---|---|
| CN | 111692572 A | 9/2020 | | |
| DE | 19754227 A1 | 6/1999 | | |
| EP | 0726156 A1 * | 8/1996 | ............ | B41J 2/2114 |

* cited by examiner

*Primary Examiner* — Alexander M Weddle
(74) *Attorney, Agent, or Firm* — Sterne, Kessler, Goldstein & Fox P.L.L.C.

(57) ABSTRACT

A method for producing a light pane for an illuminant, in particular for a luminaire or a headlight of a motor vehicle, comprising the steps of: providing a translucent base body of the light pane, reading out or receiving a printing pattern from or of a data source (6), wherein the printing pattern specifies a printing region of the base body (4) to be provided with an opaque color layer, controlling a printing device according to the printing pattern, so that the color layer is applied in the printing region.

7 Claims, 2 Drawing Sheets

METHOD FOR PRODUCING A LIGHT PANE FOR AN ILLUMINANT, LIGHT PANE, ILLUMINANT, AND MOTOR VEHICLE

TECHNICAL FIELD

The present disclosure relates to a method for producing a light pane for an illuminant, in particular for a luminaire or a headlight of a motor vehicle. In addition, the present disclosure relates to a light pane, an illuminant, and a motor vehicle.

BACKGROUND

In front of luminaires or headlights, for example in motor vehicles, a transparent light pane is generally used, which protects the light source, electronics of the luminaire or of the headlamp or the reflector region from weather and environmental influences. For this purpose, the light pane can in particular contact the body of the motor vehicle or a housing substantially without gaps or via a seal. Additionally or alternatively to a protective function, such a light pane can also have an optical function. For example, the light pane can adapt the light distribution provided by the light source in that lens-like effects are achieved, for example, by a suitable shaping of the light pane, and/or the color of the light can be adapted by tinting the light pane.

It is often desirable for edge regions of the light pane to be opaque, since seals, moist regions, connection components, electronic components, etc. arranged in this region are to be covered in order not to interfere with the visual impression. A good light transmittance in the central region of the light pane and an opaqueness or light impermeability at the edge are thus typically desired.

In order to achieve these properties, it is known in the case of plastic light panes to produce them by means of two-component injection molding, in which initially a base body made of transparent plastic is injection-molded, onto which light pane portions made of opaque plastic are subsequently injection-molded.

For example, a transparent plastic layer with an opaque layer can be back-injected in the edge regions. In the opaque region of the light pane, this is thus designed to be double-walled, so to speak. However, this results in an additional material requirement for the light pane and its weight is increased. In addition, two-component injection molding, in particular when small series are to be produced, for example for headlight options of motor vehicles, can lead to high production costs.

The document DE 197 54 227 A1 proposes, for the production of light panes with opaque edge regions, applying an opaque film or a translucent coating to the edge side of a transparent light pane. However, a complete automation of these work steps is relatively complicated and thus is expedient only in the case of very large quantities. If small series of light panes are thus to be produced, for example for a plurality of different models or for headlight options, at least partially manual manufacturing is required, which in turn results in high production costs.

BRIEF DESCRIPTION OF DRAWINGS/FIGURES

Figure 1:
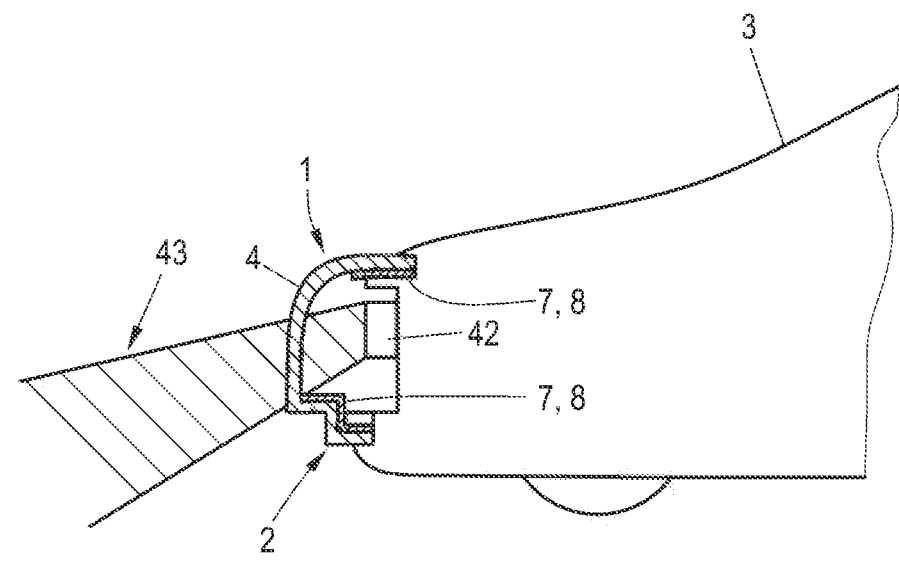
Figure 2:
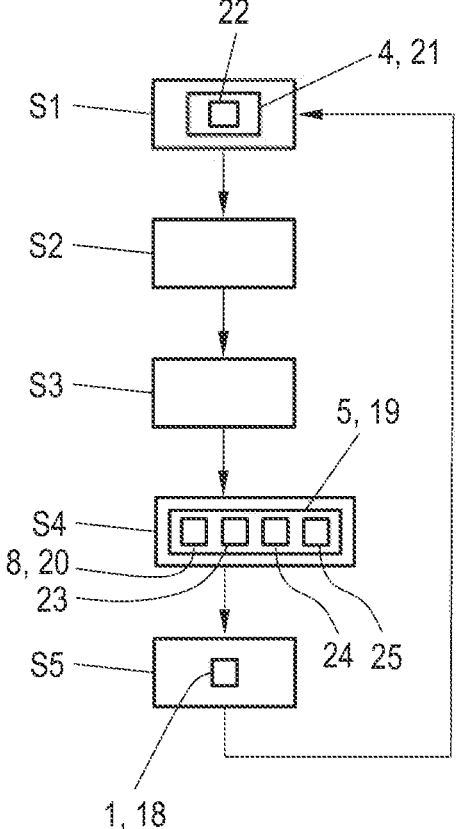
Figure 3:
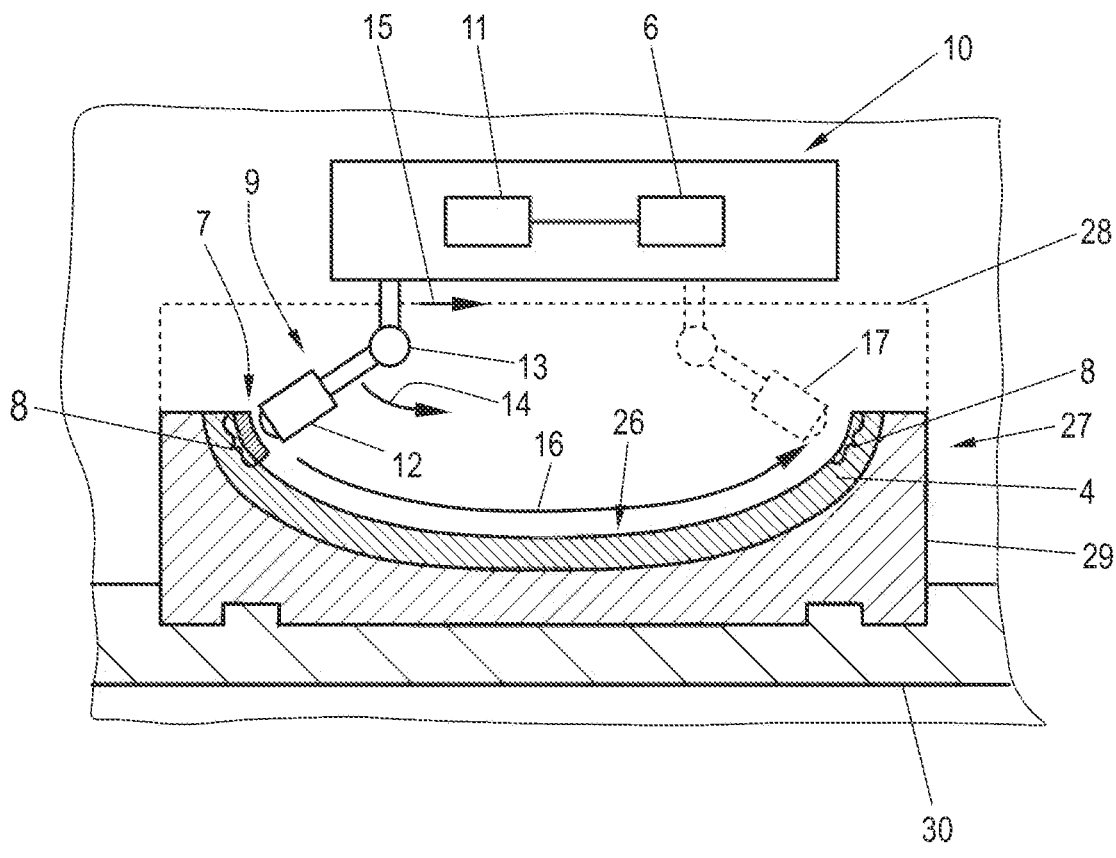
Figure 4:
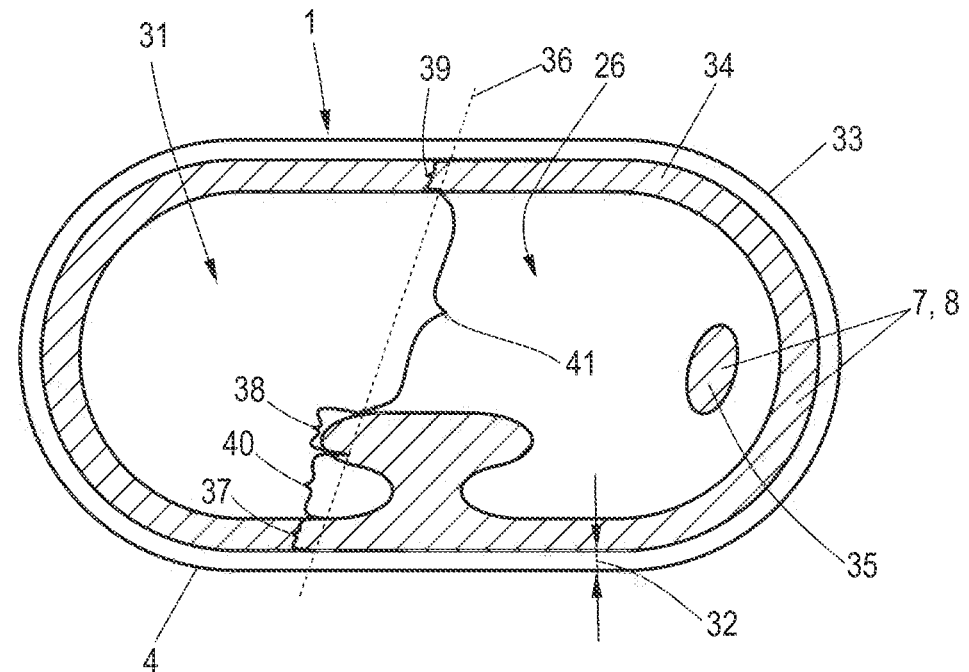

FIG. 1 illustrates a schematic diagram of a motor vehicle in accordance with an exemplary embodiment, FIG. 2 illustrates a flow chart in accordance with an exemplary embodiment, FIG. 3 illustrates an intermediate step in accordance with an exemplary embodiment, and FIG. 4 illustrates a schematic diagram of a light pane in accordance with an exemplary embodiment.

DETAILED DESCRIPTION

The problem to be solved by the present disclosure is therefore to reduce the effort and thus the costs of producing light panes for illuminants, in particular in the case of production of small series or individual pieces adaptable to customer requirements.

The problem is solved by a method for producing a light pane for an illuminant, in particular for a luminaire or a headlight of a motor vehicle, comprising the following steps:

providing a translucent base body of the light pane, reading out or receiving a printing pattern from or of a data source, wherein the printing pattern defines a printing region of the base body to be provided with an opaque color layer, controlling a printing device according to the printing pattern, so that the color layer is applied in the printing region.

By using a printing process to apply the color layer to the base body in conjunction with an, in particular digital, provision of the printing pattern from a data source, i.e., in other words by using a digital print, the printing is easily variable by changing the printing pattern provided and, with a suitable printing device, it is even possible to print base bodies that are shaped significantly differently from one another by adapting the printing pattern.

Compared to conventional processes, i.e., for example, in two-component injection molding or the application of opaque films to a base body, a changeover of the production to a differently designed light pane is thus possible with considerably little effort, without the degree of automation having to be reduced. Small series can thus also be produced in a highly automated manner or even an individual adaptation to customer or design requests can take place. For example, it can be unproblematically possible in the described method to adapt the color of the color layer to the paint color of a motor vehicle in which the light pane is to be used, or to produce contrasts with the paint color in a targeted manner. Various possibilities for adaptation of the printing process are explained in more detail later.

The transmission through the opaque color layer can be less than 0.2 or less than 0.1 or less than 0.05 at least at one point of the color layer. The opaque color layer can in particular be black, but colored opaque color layers can also be used. The base body can be formed from plastic, glass or also from another transparent material. In particular, the transmission of the base body in unprinted regions or before printing can be greater at least by a factor of 5 or 10 or 100 than the transmission through the opaque color layer in its portion with minimal transmission or in a circumferential edge region of the light pane provided with the opaque color layer.

The light pane can in particular be a light pane for a front headlight of a motor vehicle. However, it can also be a light pane for an exterior light, for example for a brake light, a rear light, a fog light, a turn signal or a side light, or also for an interior light, for example for an interior light arranged in a roof liner of the motor vehicle, a warning light, ambient lighting, or the like.

The steps of reading out or receiving the printing pattern and controlling the printing device can also overlap. For example, the printing pattern can be received as a data stream, wherein a part of the data stream is received while the printing process is already being performed. The data source can be, for example, a server, a permanent memory, for example a "solid state disk," a mechanical hard drive, a volatile memory or RAM memory, or the like. Preferably, the printing pattern is digitally read out or received, and in principle any known digital data source or any yet to be developed can be used to provide the printing pattern.

The method according to one embodiment can also be considered as part of a method for producing a headlight or a luminaire or a motor vehicle.

After the light pane has been produced, a further base body can be provided for a further light pane, a further printing pattern can be read out or received, and the printing device can be controlled according to the further printing pattern, wherein a further printing region specified by the further printing pattern differs from the printing region, and/or wherein the outer shape of the further base body differs from the outer shape of the base body, and/or wherein the printing device is configured to apply color layers with different colors or color patterns in the respective printing region to the respective base body depending on the respective printing pattern, wherein the further printing pattern specifies a different color or a different color pattern than the printing pattern.

When using a suitable printing device, in particular when using a printing device with a print head that is displaceable and/or pivotable in multiple dimensions, for example, when the print head is mounted to a robot arm, the printing region can be flexibly selected even in the case of curved or complexly shaped surfaces to be printed. This can be expedient, for example, if edges of different widths are to be provided with an opaque color layer for different light panes produced, additional patterns or structures are to be printed onto the light pane, or the like.

With a suitable printing device, differently shaped surfaces can also be printed. In this case, it is in principle possible for the printing device to be suitable in itself for guiding the print head over any shaped surface, for example, in that a distance sensor is provided on the print head and a distance from the surface to be printed is controlled. However, it can be particularly advantageous to specify the guidance of the print head via the printing pattern, whereby base bodies with different outer shapes can be printed without problems by specifying a respective suitable printing pattern.

The outer shape of the base body and of the further base body can in particular differ with respect to the shape of the surface that forms the printing region or is to be provided with the opaque color layer. For example, the base body and the further base body can have different curvatures and/or dimensions of the surface forming the printing region.

Insofar as the printing device is suitable for multicolor printing, corresponding colors or color patterns that are to be used for the color layer can also be specified via the printing pattern. As explained at the outset, the opaque region of the light pane can thereby be adapted to a body color of the motor vehicle, for example. However, it is also possible, for example, to apply logos or interesting colored patterns in parts of the light pane for which no transparency is required.

A printing device can be used which comprises a print head for applying the respective color of the color layer and an actuator system, which is in particular a robot arm or comprises a robot arm, for moving the print head, wherein the print head is guided by the actuator system along a curved surface of the base body, which forms at least a part of the printing region, to apply the color layer. The actuator system or the robot arm can, for example, be a six-axis robot arm in order to enable substantially any positioning and orientations of the print head within a certain movement radius. However, depending on how strongly the outer shapes of the base bodies to be printed deviate from one another or how flexible of a printing should be possible, simpler actuators can also be used.

Control information for the actuator system that controls the movement of the print head along the curved surface can be specified by the printing pattern or determined depending on the printing pattern. For example, the printing pattern can contain a sequence of displacements and/or pivotings of the print head or such a sequence can be generated depending on the printing pattern, so that curved surfaces can be printed by a suitable printing pattern. Alternatively, however, it would also be possible, for example, for only the movement of the print head within a, potentially curved, surface to be specified by the printing pattern, wherein the guidance of the print head along the, potentially curved, surface can be realized, for example, by distance sensors or the like.

If exclusively base bodies with a fixed shape of the surface to be printed are used, it is also possible to guide the print head on a fixed path and to specify, for example, only a control of color nozzles or the like by the printing pattern, so that different patterns or colors or color patterns can be printed.

The provision of the base body can comprise the production of the base body by injection molding in an injection mold, wherein the printing region is exposed after injection molding by separating a first mold component of the injection mold from a second mold component of the injection mold, wherein the base body initially remains in the second mold component, wherein the color layer is applied in the printing region before the base body is removed from the second mold component.

The procedure described is advantageous since, in this case, only an exact positioning of these components relative to the second mold component is required for exact positioning of the base body with respect to the printing device or the print head. For example, the printing device or a printing machine comprising it can be arranged in a stationary manner with respect to the injection mold, whereby a printing can take place after the injection mold has been opened. Alternatively, for example, the second mold component with the base body contained therein can be guided via a conveyor line to the printing device or printing machine. The second mold component can be designed in such a way that it can be handled with high precision in this case, for example, by providing suitable grooves, projections, or the like for handling and positioning.

The injection mold can be designed for simultaneous injection molding of exactly one base body. Alternatively, however, multiple identical or different base bodies can also be injection molded in the injection mold in parallel, which base bodies can subsequently be provided with a color layer, as explained above.

Alternatively, it would also be possible to carry out the printing or the application of the opaque color layer in a separate process independent of the injection molding or to print on a base body which is produced in a different way, for example by machining. In this case, it can be advantageous to provide suitable shapes or stops for exact positioning of the base body with respect to the printing device, and/or the specific position of the base body with respect to the printing device can be detected by sensors and the control of the printing device or of its actuator system for moving a print head can be adapted accordingly.

The printing region can completely surround an exposed portion of the surface of the base body, which does not have a color layer or has exclusively a translucent color layer. Additionally or alternatively, an outer edge of the printing region can be less than 5% or less than 2% of the maximum diameter of the base body away from an outer edge of the surface of the base body having the printing region. It is thus in particular possible for the applied opaque color layer to serve to form an opaque edge of the light pane, for example in order to cover seals, moist regions, connection components, electronic components, etc., as mentioned at the outset.

The printing region can have at least two separate portions which are not connected by the opaque color layer in the produced light pane. Additionally or alternatively, after application of the color layer in a sectional plane perpendicular to the surface of the base body which comprises the printing region, the base body can have the opaque color layer in at least three separate portions, wherein the separate portions are separated from one another in the sectional plane by surface portions which do not have a color layer or have exclusively a translucent color layer. Thus, for example, complex patterns with separate printing regions or undercut or concave color surfaces can be applied to the base body. Additional degrees of design freedom for the light pane result, or the application of additional design features to the base body is made possible, and, for example, a clearer optical differentiation of basic headlights and headlight options in motor vehicles can be achieved, even in the case of inactive headlights, than would be the case with exclusive blackening of a light pane edge for both headlight types.

In addition to the method according to the present disclosure, another embodiment relates to a light pane for an illuminant, in particular for a luminaire or a headlight of a motor vehicle, wherein the light pane is produced or can be produced by the method according to the present disclosure.

In addition, the present disclosure relates to an illuminant, in particular a luminaire or a headlight for a motor vehicle, comprising a light source, wherein the illuminant comprises a light pane which is arranged between the light source and a region to be illuminated by the illuminant.

In addition, the present disclosure relates to a motor vehicle which comprises an illuminant and/or a light pane.

Features which have been explained with respect to the method, the light pane, the illuminant or the motor vehicle can be transferred to each of the other of the disclosed objects with the aforementioned advantages.

FIG. 1 illustrates a motor vehicle 3 which has an illuminant 2, in the example a headlight, the light source 42 of which is separated by a light pane 1 from a region 43 which is to be illuminated by the illuminant 42. Such light panes are frequently used in illuminants in order to protect the light source 42 or an electronics system (not shown) associated with it from ambient or weather influences and/or to color the light radiated through the light pane 1 or to form the illuminated region, for example, by a lens-like design of the light pane 1.

Certain regions, in particular edge regions, of the light pane 1 should often be opaque to conceal, for example, seals, electronics, moist regions or edge regions which could potentially disturb the visual impression of the motor vehicle 3 or the illuminant 2 for an external observer. One possible approach here is to produce the light pane 1 by two-component injection molding, wherein a transparent plastic, which forms the majority of the light pane 1, is back-molded in regions with non-transparent further plastic. However, such an approach leads to minor variations of the design of the light pane 1, for example, in order to be able to offer headlight options for customers, requiring separate injection molds, whereby relatively high production costs can result for small quantities. In addition, such a two-component injection molding often leads to an increased weight and/or installation space consumption of the light pane.

In the example shown, a different production method for producing the light pane 1 is therefore used, which is explained in more detail below with additional reference to FIGS. 2 and 3. FIG. 2 here shows a flow chart for an exemplary embodiment of such a method, and FIG. 3 schematically shows the components used for producing the light pane 1 in an intermediate step of the production method.

In step S1 of the production method, a translucent base body 4 for the light pane 1 is initially provided. The base body 4 can be produced in an upstream step before the start of the method. The production can in principle take place in any manner.

In the following, however, it is assumed by way of example that the base body 4 is produced by injection molding in an injection mold 27, wherein in FIG. 3, which shows a later production step, namely step S5, only a second mold component 29 of the injection mold 27 is shown in which the base body 4 remains in the example as part of the printing explained later. The first mold component 28 of the injection mold 27 that has already been removed in FIG. 3 after completion of the injection molding process is therefore shown there only as a dashed outline. The injection molding can take place in a conventional manner, wherein a transparent or generally translucent, for example a completely transparent or also tinted, plastic is used as injection molding material.

In step S2, the injection mold 27 is opened, wherein, as already mentioned above, the base body 4 is not completely removed from the injection mold 27 in the example, but initially remains in the second mold component 29.

The second mold component 29 with the base body 4 accommodated therein is then inserted into a printing machine 10 in step S3 and is positioned in the example by a precisely fitting holding plate 30 of the printing machine 10 with a high degree of accuracy with respect to the printing machine or with respect to the printing device 9 of the printing machine 10. Alternatively, it would be possible, for example, to carry out the injection molding process already within the printing machine 10 and, for example, to retract only the print head 12 from the second mold component 29 in a suitable manner in order to enable a closing of the injection mold 27 or, after injection molding, a removal of the first mold component 28.

In step S4, a printing pattern 5 is read out from a data source 6, which is an internal memory of the printing machine 10 in the example. Alternatively, the printing pattern 5 could also be read out or received from an external data source, i.e., provided, for example, by a server (not shown). The printing pattern 5 specifies a printing region 8 of the base body 4 which is to be provided with or printed with an opaque color layer 7 and which extends in the example along the edge of a surface 26 of the base body 4 to be printed.

In step S5, the printing device 9 is actuated according to the printing pattern 5, in the example by the internal control device 11 of the printing machine 10, so that the color layer 7 is applied in the printing region 8. FIG. 3 shows an intermediate result in which the printing region 8 is already provided with a color layer 7 on the left in the image, after which the actuator system 13 is actuated by the control device 11 in order to move the print head 12, as schematically shown by the arrows 14 to 16, in the direction of the still free printing region 8 in FIG. 3 to the right in the image in order to apply a further portion of the color layer 7 there.

In the example shown in FIG. 2, the printing pattern 5 additionally comprises control information 23 for the actuator system 13, which is output by the control device 11 to the actuator 13 in order to move the print head 12 along the curved surface 26 of the base body 4 in order to print the printing region 8. If the shape of the base body 4 is known, corresponding control information 23 could be obtained directly from the definition of the printing region 8 itself. However, the specification of control information 23 as part of the printing pattern 5 can be advantageous if base bodies 4, 21 of different light panes 1, 18 are to be printed by the same printing device 9 or printing machine 10. In this case, it may be possible for the surface 26 to be printed to have different shapes 22 in different printing processes, which can be taken into account by providing corresponding control information 23 or additional information from which this results, for example a shape definition for the base body 4. By providing different printing patterns 5, 19, base bodies 4, 21 with different shapes 22 can thus also be printed.

In the example, a printing device 9 is used which can apply color layers 7 with different colors 24 or even with color patterns 25, that is to say with different colors in different partial regions of the printed region, onto the respective base body 4, 21. This can be expedient, for example, in order to adapt the color of a color layer provided at the edge of the light pane to the body color of the motor vehicle 3, and/or to print, for example, colored logos and/or decorative elements onto the light pane 1.

As already mentioned above, the explained method can also be used to successively produce different light panes 1, 18. For example, in the context of a repetition of steps S1 to S5, differently shaped base bodies 4, 21 can be used or printed. As explained above, the different shape 22 of the base bodies 4, 21 can be taken into account by providing a printing pattern 5, 19 adapted to the mold 22, wherein the printing patterns 5, 19 can differ from one another in particular with respect to the control information 23 specified by them in order to take into account the different shapes of the base bodies 4, 21.

Instead of an explicit specification of the respective control information 23, it would alternatively be possible, for example, to specify parameters or other information describing the respective shape 22 as part of the printing pattern 5, 19, and to determine the control information 23, for example, by the control device 11, depending on this information.

In principle, it would also be possible to detect, using sensors, different shapes 22 or, for example, curvatures of the surface 26 to be printed, so that it can be sufficient to specify only the respective printing region 8, 20 as part of the respective printing pattern 5, 19.

Additionally or alternatively, differently produced light panes 1, 18 can differ from one another by the printing region 8, 20 provided with the opaque color layer 7 in each case, whereby different light panes can be produced simply by specifying different printing patterns 5, 19. The same applies to the use of different colors 24 or different color patterns 25 for the light panes 1, 18.

FIG. 4 illustrates a plan view of the printed surface 26 of an exemplary light pane 1, which is produced or can be produced by the method explained above, or which can be used in the illuminant 2 or motor vehicle 3 shown in FIG. 1. As already explained at the outset, an opaque printing of the edge of the light pane 1 is often desired, so that an exposed portion 31, in which no color layer 7 or exclusively a translucent color layer is applied to the surface 26, is completely surrounded by the printing region 8 or a portion 34 of the printing region and thus by a closed color layer 7.

The outer edge of this printing region 8 or of the portion 34 coincides substantially with the outer edge 33 of the surface 26 of the base body 4, so that the distance 32 shown schematically in FIG. 4 is less than 5% or even less than 2% of the maximum diameter of the base body 4. In principle, the printing can also extend completely up to the edge, wherein, depending on the embodiment of the printing device, a minimum free edge region may be required for technical reasons.

As can be seen from the above explanations, substantially any parts of the surface 26 can be printed or provided with the opaque color layer 7 in the explained method by specifying a suitable printing pattern 5, 19. This makes it possible, for example, for the printing region 8, as shown by way of example in FIG. 4, to have separate portions 34, 35 which are not connected by the opaque color layer 7 in the produced light pane 1. The section 35 separate from the printing on the edge can serve, for example, to show a logo, to improve the design of the light pane 1 and thus of the illuminant 2 or of the motor vehicle 3, and the like. A corresponding overprint can in particular be affixed in regions which are intended to form exclusively a part of the housing of the illuminant 2 and are not to be irradiated by emitted light during normal operation. Additionally or alternatively, however, additional printed portions 35 can also be used to shape the light distribution of the illuminant 2.

The possibility of being able to print substantially any portions 34, 35 by specifying a suitable printing pattern 5, 19 can also be used to apply relatively complex patterns, for example, the concave or undercut color surface, as shown in FIG. 4 at the lower edge of the light pane 1. For example, such a pattern can be characterized in that the opaque color layer 7 is applied in at least three separate portions 37 to 39 in a sectional plane 36 perpendicular to the surface 26 of the base body which comprises the printing region 8, wherein the separate portions are separated from one another in the sectional plane 36 by surface portions 40, 41, which do not have a color layer 7 or have exclusively a translucent color layer.

The invention claimed is:

1. A method for producing a light pane for a luminaire or a headlight of a motor vehicle, comprising:
   providing a translucent base body of the light pane;
   reading out or receiving a printing pattern from a data source, wherein the printing pattern specifies a printing region of the translucent base body to be provided with an opaque color layer;
   applying a color layer in the printing region by controlling a printing device according to the printing pattern; and
   exposing the printing region in an injection mold by separating a first mold component of the injection mold from a second mold component of the injection mold, wherein the translucent base body initially remains in the second mold component, and wherein applying the color layer in the printing region occurs before the translucent base body is removed from the second mold component.

2. The method according to claim 1, wherein a further translucent base body is provided for a further light pane after the light pane has been produced, a further printing pattern is read out or received, and the printing device is controlled according to the further printing pattern, wherein a further printing region specified by the further printing pattern differs from the printing region, and/or wherein an outer shape of the further translucent base body differs from the outer shape of the translucent base body, and/or wherein the printing device is configured to apply color layers with different colors or color patterns in the respective printing region to the respective translucent base body based on the respective printing pattern, wherein the further printing pattern specifies a color or another color pattern different from the printing pattern.

3. The method according to claim 1, further comprising:

applying a respective color of the color layer using a print head, wherein applying the respective color includes using an actuator system to move the print head by guiding the print head along a curved surface of the translucent base body, the curved surface forming at least a part of the printing region, and wherein the printing device comprises the print head and the actuator system.

4. The method according to claim 3, wherein the actuator system includes a robot arm.

5. The method according to claim 3, wherein control information for the actuator system is specified by the printing pattern or determined based on the printing pattern, the control information controlling movement of the print head along the curved surface.

6. The method according to claim 1, wherein the printing region completely surrounds an exposed portion of the surface of the translucent base body, wherein the exposed portion does not have the color layer or has exclusively a translucent color layer, and/or in that an outer edge of the printing region is less than 5% of the maximum diameter of the translucent base body away from an outer edge or a surface of the translucent base body having the printing region.

7. The method according to claim 1, wherein the printing region has at least two separate portions which are not connected by the opaque color layer in the light pane, and/or after the color layer has been applied, the translucent base body has the opaque color layer in at least three separate portions in a sectional plane perpendicular to the surface of the translucent base body, which comprises the printing region, wherein the at least three separate portions are separated from one another in the sectional plane by surface portions, which do not have the color layer or have exclusively a translucent color layer.

* * * * *